US007226968B2

(12) United States Patent
Hodge et al.

(10) Patent No.: US 7,226,968 B2
(45) Date of Patent: Jun. 5, 2007

(54) COMPOSITION AND USE

(75) Inventors: David John Hodge, Hereford (GB); David Alan Pears, Poynton (GB); John Jeffrey Gerrard, Chester (GB); Paula Louise McGeechan, Bury (GB)

(73) Assignee: Arch UK Biocides Limited, Blackley, Manchester (GB)

( * ) Notice: Subject to any disclaimer, the term of this patent is extended or adjusted under 35 U.S.C. 154(b) by 0 days.

(21) Appl. No.: 10/850,066

(22) Filed: May 20, 2004

(65) Prior Publication Data
US 2005/0009971 A1 Jan. 13, 2005

Related U.S. Application Data

(60) Provisional application No. 60/471,730, filed on May 20, 2003.

(51) Int. Cl.
C08G 81/02 (2006.01)
(52) U.S. Cl. ............... 524/514; 524/457; 524/237; 524/195; 525/293; 525/63
(58) Field of Classification Search ................ 524/195, 524/237, 457, 514; 424/78.08; 525/63, 525/293
See application file for complete search history.

(56) References Cited

U.S. PATENT DOCUMENTS 6,497,868 B1 * 12/2002 Tanahashi ................ 424/78.08

6,555,225 B1 * 4/2003 Yoshioka et al. ......... 428/411.1
2001/0007063 A1 * 7/2001 Oyama et al. ............. 604/266
2002/0035357 A1 * 3/2002 Faour et al. ............. 604/890.1
2003/0224030 A1 * 12/2003 Uchiyama et al. .......... 424/405

FOREIGN PATENT DOCUMENTS

| EP | 0182523 | | 5/1986 |
| EP | 0232006 | | 8/1987 |
| EP | 0522668 | | 1/1993 |
| GB | 2213721 | | 8/1989 |
| JP | 61152605 | | 7/1986 |
| JP | 11-099200 | * | 4/1999 |
| JP | 11099200 A | * | 4/1999 |
| WO | WO 97/04756 | * | 2/1997 |
| WO | 00/02449 | | 1/2000 |
| WO | 02/28952 | | 4/2002 |
| WO | WO 02/28952 A1 | * | 4/2002 |

OTHER PUBLICATIONS

"Principals of Polymerisation," G. Odian, Wiley, Interscience, 3$^{rd}$ Ed., 1991, pp. 303-355.
P. Silley et al., "Impedance microbiology—a rapid change for microbiologists," Journal of Applied Biotechnology, vol. 80, 1996, pp. 233-243.

* cited by examiner

*Primary Examiner*—Ling-Sui Choi
(74) *Attorney, Agent, or Firm*—Wiggin and Dana LLP; Dale L. Carlson; Elizabeth A. Galletta

(57) ABSTRACT

A composition containing (i) an anti-microbial agent that comprises a polymeric biguanide, either alone or in combination with at least one other microbiologically active component and (ii) a basic co-polymer of the Formula (1):

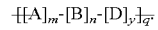

Formula (1)

19 Claims, 4 Drawing Sheets

UV Spectroscopic Calibration Curve for Poly(hexamethylene biguanide) (PHMB) concentation measured at 236 nm.

■ - PHMB alone, ♦ - Composition 9

Measurement of the release of PHMB from the PHMB/Basic Co-polymer.

■ - Composition 9     ● - Composition 19

The Effect of PHMB loading on the release rate of PHMB from the PHMB/Basic Co-Polymer Films.

■ Composition 9, ◆ Composition 7

COMPOSITION AND USE

CROSS-REFERENCE TO RELATED CASES

Priority is herewith claimed under 35 U.S.C. §119(e) from U.S. Provisional Patent Application No. 60/471,730, filed May 20, 2003, entitled "COMPOSITION AND USE", by David John Hodge et al. The disclosure of this U.S. Provisional Application is incorporated by reference herein in its entirety.

BACKGROUND OF THE INVENTION

1. Field of the Invention

The present invention relates to a method for inhibiting the growth of micro-organisms on surfaces by means of a composition comprising a basic vinyl comb type co-polymer and an anti-microbial agent. The antimicrobial agent is controllably released from the basic co-polymer over time thereby providing effective anti-microbial control.

Micro-organisms can be found on many inanimate and animate surfaces. The presence of such micro-organisms can result in unhygienic conditions in hospitals and medical environments, kitchens, bathrooms, toilets and in the preparation and packaging of foodstuffs leading to health risks and contamination.

Several anti-microbial agents exist which are effective against many of the virulent forms of micro-organisms found in the food and health-care environments. Unfortunately, the activity of such agents is insufficient in terms of providing a sustained, surface hygienic effect. This may be due to the high water solubility and/or lack of substantivity of the anti-microbial agent on a surface which means that the anti-microbial agent is readily displaced. There is therefore a requirement for an anti-microbial agent or an anti-microbial agent in combination with a delivery system which provides a high degree of anti-microbial kill over a sustained period of time.

2. Brief Description of Art

The literature describes various cases were micro-organisms and in particular bacterial fouling may cause damage or lead to contamination of surfaces including for example swimming pools, industrial pipes, architectural structures, ships hulls, hospital theatres, teeth and kitchen surfaces. Indeed, there have been many attempts and approaches to overcome the micro-biological problems associated especially with bacterial growth on inanimate and animate surfaces.

European Patent 0182523 describes how certain polymeric compositions are effective at preventing oral bacteria from colonisation on the surface of teeth. In UK Patent 2213721, an anti-staining composition comprising polymers with anti-bacterial agents were shown to be effective against bacteria found in an oral environment.

In European Patent 0232006, coating compositions comprising sulphonated polymers and a microbicide for use in marine environments were shown to have hydrolytic instability. In the above cases, the coating of polymer in an aqueous environment with or without microbicide was substantially erodable, thereby acting by means of a self-polishing effect, thereby reducing the ability of bacteria to colonise on the surface to be protected.

WO/02449 describes a process for the biocidal treatment of surfaces comprising high molecular weight grafted co-polymers.

However, none of the above documents describe an anti-microbial system which has the ability to eliminate micro-organisms effectively and has a sustained, surface hygienic effect.

The term 'sustained' used hereinafter refers to an anti-microbial agent which is still active even after the surface to which the agent has been applied has been cleansed for example by wiping, rinsing or washing the surface.

BRIEF DESCRIPTON OF THE DRAWINGS

The invention will be more fully understood from the following detailed description taken in conjunction with the accompanying drawings in which.

DESCRIPTION OF THE INVENTION

Figure 1:
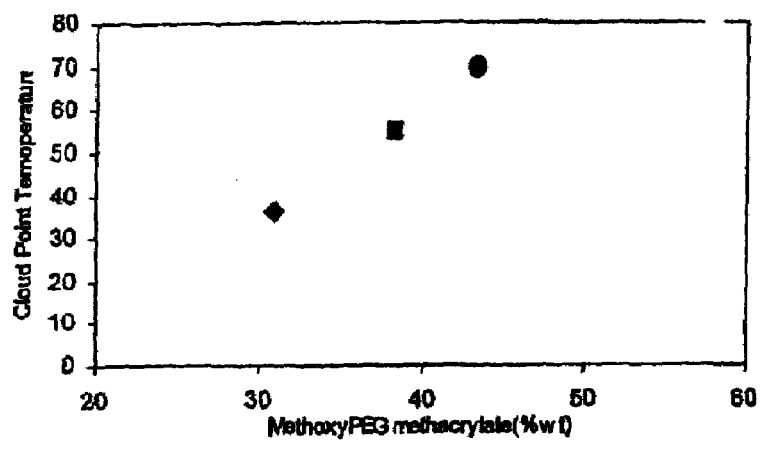
FIG. 1 shows a graph of basic co-polymer cloud point variation as a function of PEG550Ma content.

Surprisingly we have now found that a combination of certain anti-microbial and basic vinyl comb type co-polymers (referred to hereinafter as basic co-polymers) provides effective and sustained anti-microbial activity when used to inhibit the growth of micro-organisms on surfaces. The present invention provides compositions for the treatment of surfaces based on basic co-polymers with varying functionality in both the backbone and the side chain in combination with an anti-microbial agent, especially a biocide.

Consequently, according to a first aspect of the present invention there is provided a composition comprising:

(i) an anti-microbial agent comprising a polymeric biguanide, alone or in combination with at least one other microbiologically active component selected from the group consisting of quaternary ammonium compounds, monoquaternary heterocyclic amine salts, urea derivatives, amino compounds, imidazole derivatives, nitrile compounds, tin compounds or complexes, isothiazolin-3-ones, thiazole derivatives, nitro compounds, iodine compounds, aldehyde release agents, thiones, triazine derivatives, oxazolidine and derivatives thereof, furan and derivatives thereof, carboxylic acids and the salts and esters thereof, phenol and derivatives thereof, sulphone derivatives, imides, thioamides, 2-mercapto-pyridine-N-oxide, azole fungicides, strobilurins, amides, carbamates, pyridine derivatives, compounds with active halogen groups, and organometallic compounds; and (ii) a basic co-polymer of the Formula (1):

 Formula (1)

wherein:

[A] is of Formula (9),

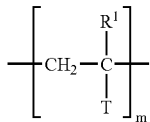

Formula (9)

[B] is of Formula (10),

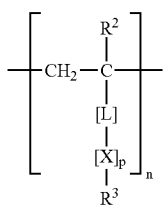

Formula (10)

and [D] is of Formula (12),

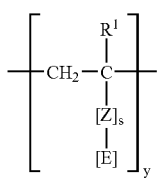

Formula (12)

wherein:
X is of Formula (11),

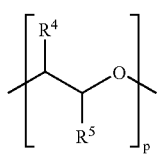

Formula (11)

wherein [A], [B] and [D] may occur in any order;
T is an optionally substituted substituent;
L and Z each independently is an optionally substituted linking group;
$R^1$, $R^2$ and $R^3$ are each independently H; optionally substituted $C_{1-20}$-alkyl or optionally substituted $C_{3-20}$-cycloalkyl;
$R^4$ and $R^5$ are each independently H or $C_{1-4}$-alkyl;
E is a basic substituent;
q is 15 to 1000;
m is 0 to 350;
n is 1 to 75;
y is 1 to 100;
s is 0 or 1;
p is 3 to 50; and provided that at least one of $R^4$ and $R^5$ is H and provided that $R^1$, $R^2$, $R^3$, T, L and Z do not contain an acidic group which can protonate E on [D].

A preferred anti-microbial agent for use in the composition according to the first aspect of the present invention is an anti-bacterial agent, more preferably a polymeric biguanide.

Polymeric Biguanide

Preferably the polymeric biguanide comprises at least two biguanide units of Formula (2):

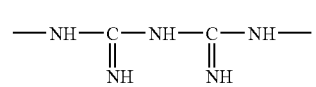

Formula (2)

linked by a bridging group which contains at least one methylene group. The bridging group preferably includes a polymethylene chain, optionally incorporating or substituted by one or more hetero atoms such as oxygen, sulphur or nitrogen. The bridging group may include one or more cyclic moieties which may be saturated or unsaturated. Preferably, the bridging group is such that there are at least three, and especially at least four, carbon atoms directly interposed between two adjacent biguanide units of Formula (2). Preferably, there are not greater than ten and especially not greater than eight carbon atoms interposed between two adjacent biguanide units of Formula (2).

The polymeric biguanide may be terminated by any suitable group, such as a hydrocarbyl, substituted hydrocarbyl or an amine group or a cyanoguanidine group of the Formula (3):

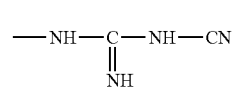

Formula (3)

When the terminating group is hydrocarbyl, it is preferably alkyl, cycloalkyl, aryl or aralkyl. When the hydrocarbyl group is alkyl it may be linear or branched but is preferably linear.

Preferred alkyl groups include $C_{1-8}$-alkyl. Examples of preferred alkyl groups include for example methyl, ethyl, n-propyl, isopropyl, n-pentyl, n-butyl, isobutyl, tert-butyl and n-octyl.

When the hydrocarbyl group is cycloalkyl, it is preferably cyclopropyl, cyclopentyl or cyclohexyl. When the hydrocarbyl group is aralkyl, it preferably contains from 1 to 6, more preferably 1 or 2 carbon atoms in the alkylene group attaching the aryl group to the biguanide. Preferred aralkyl groups include benzyl and 2-phenylethyl groups.

Preferred aryl groups include phenyl groups. When the terminating group is substituted hydrocarbyl, the substituent may be any substituent that does not exhibit undesirable adverse effects on the microbiological properties of the polymeric biguanide. Examples of such substituents are aryloxy, alkoxy, acyl, acyloxy, halogen and nitrile.

When the polymeric biguanide contains two biguanide groups of Formula (2) the biguanide is a bisbiguanide. The two biguanide groups are preferably linked through a polymethylene group, especially a hexamethylene group.

The polymeric biguanide preferably contains more than two biguanide units of Formula (2) and is preferably a linear polymeric biguanide which has a recurring polymeric chain represented by Formula (4) or a salt thereof:

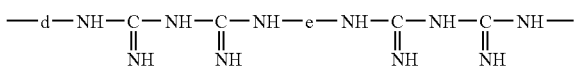

Formula (4)

wherein d and e represent bridging groups which may be the same or different and in which together the total of the number of carbon atoms directly interposed between the pairs of nitrogen atoms linked by d plus the number of carbon atoms directly interposed between the pairs of nitrogen atoms linked by e is more than 9 and less than 17.

The bridging groups d and e preferably consist of polymethylene chains, optionally interrupted by hetero atoms, for example, oxygen, sulphur or nitrogen. d and e may also incorporate moieties which may be saturated or unsaturated, in which case the number of carbon atoms directly interposed between the pairs of nitrogen atoms linked by d and e is taken as including that segment of the cyclic group, or groups, which is the shortest. Thus, the number of carbon atoms directly interposed between the nitrogen atoms in the group

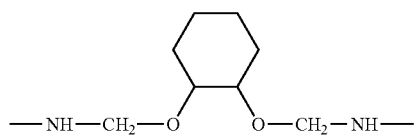

is 4 and not 8.

The linear polymeric biguanides having a recurring polymer unit of Formula (4) are typically obtained as mixtures of polymers in which the polymer chains are of different lengths. Preferably, the number of individual biguanide units of Formulae (5a) and (5b):

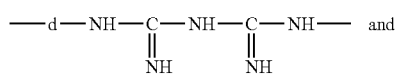

Formula (5a)

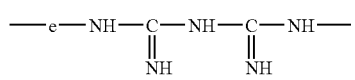

Formula (5b)

is, together, from 3 to about 80.

The preferred linear polymeric biguanide is a mixture of polymer chains in which d and e are identical and the individual polymer chains, excluding the terminating groups, are of the Formula (6) or a salt thereof:

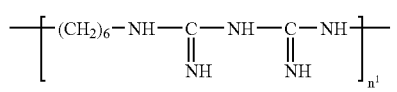

Formula (6)

wherein $n^1$ is from 4 to 20 and especially from 4 to 18. It is especially preferred that the average value of $n^1$ is about 16. Preferably, the average molecular weight of the polymer in the free base form is from 1100 to 4000.

The linear polymeric biguanides may be prepared by the reaction of a bisdicyandiamide having the Formula (7):

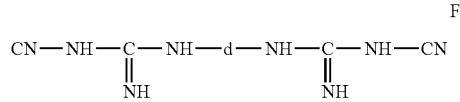

Formula (7)

with a diamine $H_2N$-e-$NH_2$, wherein d and e have the meanings defined above, or, by the reaction between a diamine salt of dicyanamide having the Formula (8):

Formula (8)

with a diamine $H_2N$-e-$NH_2$ wherein d and e have the meanings defined above. These methods of preparation are described in UK specifications numbers 702,268 and 1,152,243 respectively, and any of the polymeric biguanides described therein may be used in the present invention.

As noted hereinbefore, the polymer chains of the linear polymeric biguanides may be terminated either by an amino group or by a cyanoguanidine group of Formula (9):

Formula (9)

This cyanoguanidine group can hydrolyse during preparation of the linear polymeric biguanide yielding a guanidine end group. The terminating groups may be the same or different on each polymer chain.

A small proportion of a primary amine R—$NH_2$, where R represents an alkyl group containing from 1 to 18 carbon atoms, may be included with the diamine $H_2N$-e-$NH_2$ in the preparation of polymeric biguanides as described above. The primary amine acts as a chain-terminating agent and consequently one or both ends of the polymeric biguanide polymer chains may be terminated by an —NHR group. These —NHR chain-terminated polymeric biguanides may also be used.

The polymeric biguanides readily form salts with both inorganic and organic acids. Preferred salts of the polymeric biguanide are water-soluble.

It is especially preferred that the polymeric biguanide used in accordance with the present invention is a mixture of linear polymers, the individual polymer chains of which, excluding the terminating groups, are represented by Formula (6) in the hydrochloride salt form. This poly(hexamethylenebiguanide) compound is commercially available from Avecia Limited under the trademarks Vantocil™, Cosmocil™ and Reputex™.

Basic Co-polymers

Preferably the basic co-polymers of the present invention are as illustrated in the following Empirical Structural Formula.

Empirical Structural Formula

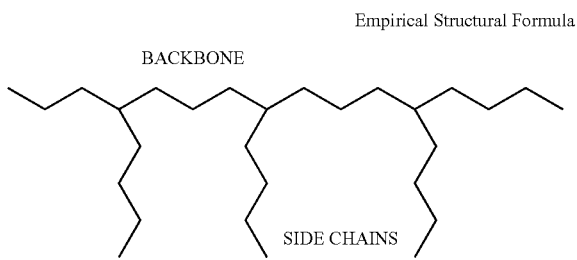

The term basic co-polymer referred to herein is used to describe a co-polymer which can be derived from an addition polymerisation reaction (that is, a free radical initiated process which can be carried out in either an aqueous or non aqueous medium) of two or more olefinically unsaturated monomers. Therefore, the term vinyl monomer used throughout refers to an olefinically unsaturated monomer.

Examples of vinyl monomers which may be used to form the basic co-polymers for use in the present invention include but are not limited to styrene, α-methyl styrene, benzyl methacrylate, acrylonitrile, methacrylonitrile, vinyl polyethers of ethylene or propylene oxide such as hydroxy-polyethoxy (5) polypropoxy (5) monoallyl ether (BX-AA-E5P5 available from Bimax Chemicals Ltd), N,N-diethyl amino ethyl(meth)acrylate, N,N-dimethyl amino ethyl (meth)acrylate, N,N-dipropyl amino ethyl(meth)acrylate, N,N-diethyl amino ethyl(meth)acrylamide, N,N-dimethyl amino ethyl(meth)acrylamide, tertiary butyl amino ethyl methacrylate, N,N-dimethyl amino propyl(meth)acrylamide, N,N-dimethyl amino propyl(meth)acrylate, 4-vinyl pyridine, 2-vinyl pyridine, vinyl imidazole, N,N-dimethyl amino methyl styrene, 4-amino styrene, N,N-dimethyl amino styrene and amino methyl styrene. Basic amine bearing monomers can be polymerised as the free amine, as a protonated salt or as a quaternised amine salt. For example, basic quaternary ammonium monomers such as N,N-dimethyl amino ethyl acrylate methyl chloride quaternary salt (available from Ciba Specialty Chemicals as AGEFLEX FA1Q80MC or Mitsubishi Rayon Co. Ltd as DMCMA), N,N-dimethyl amino ethyl methacrylate benzyl chloride quaternary salt (available from Ciba Specialty Chemicals as AGEFLEX FM1Q80BC) and N,N-dimethyl amino ethyl acrylate benzyl chloride quaternary salt (available from Ciba Specialty Chemicals as AGEFLEX FA1Q80BC). Vinyl esters can also be used for example vinyl acetate, vinyl propionate, vinyl laurate, and vinyl esters of versatic acid (available from Resolution Performance Products under the tradename VeoVa). Vinyl ethers of heterocyclic vinyl compounds, alkyl esters of mono-olefinically unsaturated dicarboxylic acids (for example di-n-butyl maleate and di-n-butyl fumarate) and in particular, esters of acrylic acid and methacrylic acid, vinyl monomers with additional functionality for subsequent crosslinking of the films, such as diacetone acrylamide, glycidyl methacrylate, aceto acetoxy ethyl methacrylate, 2-hydroxy ethyl(meth)acrylate, 4-hydroxy butyl(meth)acrylate, 3-hydroxy propyl(meth)acrylate, hydroxy stearyl(meth)acrylate, 2-hydroxyethyl(meth)acrylate and 2-(trimethylsiloxy)ethyl methacrylate, can also be used.

A particularly preferred form of basic co-polymer according to the present invention is an acrylic co-polymer, derived from ester of acrylic or methacrylic acid.

The basic co-polymers of the present invention comprise at least one polymer which comprises one or more repeating units of Formula (1):

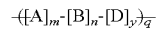   Formula (1)

wherein:

[A] is of Formula (9),

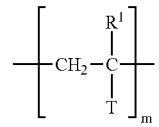   Formula (9)

[B] is of Formula (10),

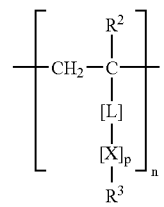   Formula (10)

and [D] is of Formula (12),

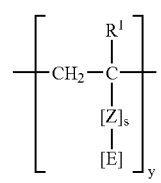   Formula (12)

X is of Formula (11),

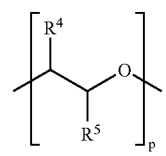   Formula (11)

wherein [A], [B] and [D] may occur in any order;
T is an optionally substituted substituent;
L and Z each independently is an optionally substituted linking group;
$R^1$, $R^2$ and $R^3$ are each independently H; optionally substituted $C_{1-20}$-alkyl or optionally substituted $C_{3-20}$-cycloalkyl;
$R^4$ and $R^5$ are each independently H or $C_{1-4}$-alkyl;
E is a basic substituent;
q is 15 to 1000;
m is 0 to 350;
n is 1 to 75;

y is 1 to 100;

s is 0 or 1;

p is 3 to 50; and provided that at least one of $R^4$ and $R^5$ is H and provided that $R^1$, $R^2$, $R^3$, T, L and Z do not contain an acidic group which can protonate E on [D].

The term acidic group referred to herein is used to describe any group which is capable of protonating basic group E on [D] for example a carboxylic acid or a sulphonic acid group.

In Formula (1), [A] is derived from any olefinically unsaturated polymerisable monomer which does not contain an ionisable or ionised functional group. [B] provides the pendant polyether comb functionality of the basic co-polymer and [C] provides the basic functionality either in the form of a free amine, a protonated amine salt or a quaternised amine salt.

The basic co-polymer of Formula (1) comprises a backbone with pendant polyalkylene oxide and basic functionalities wherein the pka of basic substituent [E] in the monomer from which [D] is derived is in the range from 5.5 to 13.5. More preferably the pKa value of the basic substituent [E] in the monomer from which [D] is derived is in the range from 8 to 12.

The $pK_a$ value for the basic component [E] is a measure of the acid strength of the conjugate acid $[EH]^+$ of the basic group [E] where $K_a$ is defined as:

$$K_a = keq\,[H_2O] = \frac{[E]}{[EH^+][OH^-]}$$

wherein $pK_a = -\log K_a$, and Keq is the equilibrium constant.

The basic co-polymers of the present invention commonly comprise [B] in the range from 10 to 95 weight %, more preferably from 20 to 80 weight % and most preferably from 30 to 70 weight %.

[A] is preferably present in the range of from 0 to 25 weight %.

[D] is preferably present in the range of from 1 to 80 weight %, more preferably from 1 to 60 weight % and most preferably from 5 to 50 weight %.

Preferably the molar ratios of [A] to [B] to [D], (m:n:v) respectively, are chosen such that the cloud point of the basic co-polymer is greater than 0° C. more preferably greater than 15° C. and most preferably greater than 25° C.

Preferably the basic co-polymer of the present invention comprise from 20 to 80% by weight polyethylene oxide introduced by [B], more preferably from 30 to 70% by weight polyethylene oxide introduced by [B] to achieve the required cloud point.

The cloud point value is related to the solubility of the polymer in water and refers to the boundary at which liquid-liquid phase separation takes place in a mixture of two or more components indicated by a cloudiness of the solution due to the formation of aggregates that scatter light. The temperature at which a 1% by weight solution of a polymer in distilled water becomes cloudy is the cloud point temperature.

The exact level of polyethylene oxide present in [B] and required to achieve a cloud point in the preferred range for the present invention depends on a number of factors. These include:

(i) The level and hydrophobicity of [A] in the co-polymer;

(ii) The level and hydrophobicity of [D] and whether [E] is present as a free base or as a salt in the co-polymer;

(iii) The composition of [B] as defined by $R^2$, $R^3$, X and the value of p (in Formula (11)); and (iv) The presence of organics or electrolytes in solution.

It is preferred that the anti-microbial agent/basic co-polymer compositions of the present invention form a clear solution, that is the cloud point of the basic co-polymer in the presence of an anti-microbial agent, for example poly (hexamethylene biguanide) (PHMB) is above 15° C. and more preferably above 25° C.

Whilst the value of q is preferably in the range 15 to 1000, q is most preferably from 20 to 400.

$R^1$, $R^2$ and $R^3$ are each independently H, $C_{1-20}$-alkyl or $C_{3-20}$-cycloalkyl. Preferably $R^1$, $R^2$ and $R^3$ are preferably H, $C_{1-10}$-alkyl or $C_{3-8}$-cycloalkyl. Most preferably $R^1$ is H or $CH_3$, $R^2$ is H or $CH_3$, and $R^3$ is H or $C_{1-6}$-alkyl, especially H or $CH_3$.

$R^4$ and $R^5$ in repeating monomer units of X in Formula (11), maybe the same or different, and are each independently H or $C_{1-4}$-alkyl so long as at least one of $R^4$ and $R^5$ is H. Preferably one of $R^4$ and $R^5$ is H and the other is —$CH_3$ or —$C_2H_5$ with the result that X comprises oxyethylene units or a mixture of oxyethylene, oxypropylene and/or oxybutylene units. Most preferably $R^4$ and $R^5$ are both H, such that X comprises oxyethylene units.

The value of p in Formula (10) is preferably from 3 to 50, more preferably from 3 to 40 and most preferably from 3 to 25.

T is an optionally substituted substituent examples of which include CN, OH, F, Cl, Br, —$OR^6$, —$C(O)R^6$, —$OC(O)R^6$, —$C(O)OR^6$, —$C(O)NR^7R^8$ and aryl optionally substituted by —$OC(O)R^6$, F, Cl, Br, $C_{1-6}$-alkyl, —$CH_2Cl$ or —$C(O)OR^6$.

$R^6$ is $C_{1-10}$-alkyl more preferably $C_{1-8}$-alkyl for example methyl, ethyl, propyl, butyl, isopropyl, isobutyl or tert-butyl optionally substituted by a ketone, ether, epoxide, silane or ketoester group.

$R^7$ and $R^8$ are each independently H, $C_{1-8}$-alkyl or $C_{3-8}$-cycloalkyl optionally substituted by —OH, ketone or alkyl ether groups, most preferably $R^7$ and $R^8$ are H, —$CH_3$ or $C_2H_5$.

Preferably T is of the formula $C(O)OR^6$, —$C(O)NR^7R^8$ or —$OC(O)R^6$ and most preferably T is $C(O)OR^6$, wherein $R^6$, $R^7$ and $R^8$ are as previously described.

Each L is an optionally substituted linking group which joins X to the hydrocarbyl backbone of [B]. L can be a variety of linking groups and maybe the same of different. Examples of L preferably comprise one or more carbon and/or hetero atoms, for example nitrogen or oxygen. Examples of preferred linking groups represented by L include:

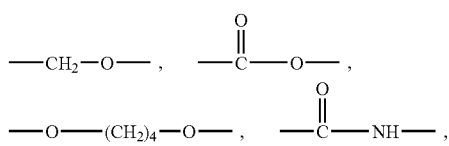

-continued

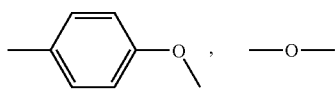

wherein the right hand side of the linking group is attached to X and the left hand side of the linking group is attached to the hydrocarbyl backbone.

It is particularly preferred that each L is of formula:

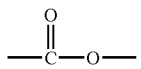

[E] is a basic substituent and each [E] is either joined directly to the hydrocarbyl component of [D] or is joined to it by an optionally substituted linking group [Z].

In cases where [Z] represents one or more groups of atoms, [Z] provides a linking chain of atoms. The chain will normally comprise one or more carbon atoms (in the form of an alkyl or aryl group) which may be optionally substituted by hetero atoms such as —N. —O, —S or P, preferably N or O.

Examples of linking groups represented by [Z] (and shown in relation to [E]) include:

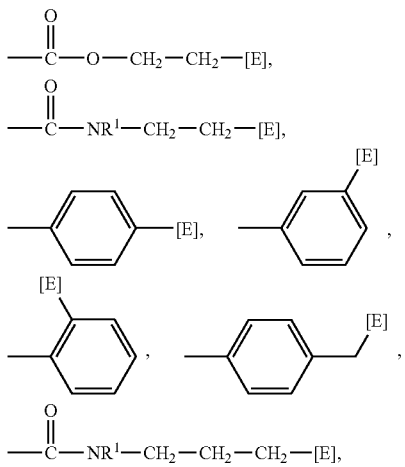

wherein $R^1$ and [E] are as previously described.

It is preferred that [E] is linked to the hydrocarbyl backbone of [D] by a linking group [Z] of the formula:

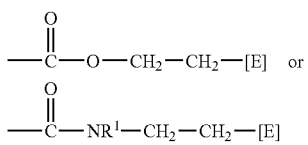

It is especially preferred that [E] is linked to the hydrocarbyl chain in [D] by a linking group [Z] represented by the formula:

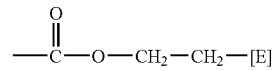

Therefore, it is preferred that s in monomer [D] is 1. Examples of the basic substituent [E] in Formula (12) of [D] include but are not limited to optionally substituted primary, secondary and tertiary aliphatic and aromatic amines, pyridine, imidazole, pyrazole, pyrimidine, pyrazine, pyrimidazine, tetrazole, 1,3,4-thiadiazole, 1,2,4-thiadiazole, pyrazole, 1,3,4-oxadiazole, 1,2,4-oxadiazole, pyrrole, 1,2,4-triazine, 1,3,5-triazine, pyrazine, pyridazine, indazole, indole and benzothiazole groups and the quaternised and protonated salts thereof.

It is preferred that [E] (shown in relation to [Z]) comprises a secondary or tertiary aliphatic amine or the protonated or quaternised salts thereof, for example:

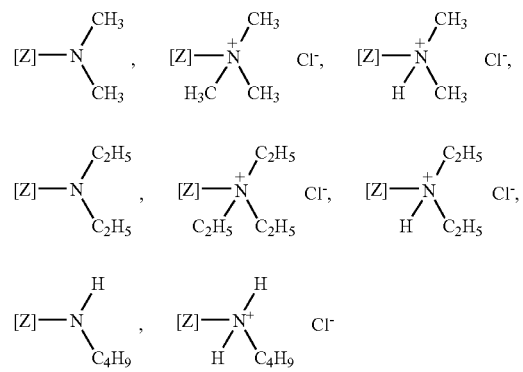

It is especially preferred that [E] comprises a tertiary aliphatic amine or the protonated or quaternised salts thereof, for example:

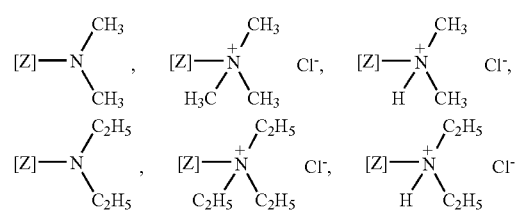

The values of m, n and v represent the molar compositions of repeat units [A], [B] and [D] respectively in the basic co-polymers of Formula [1]. The value of m is preferably in the range from 0 to 350, more preferably from 0 to 100 and most preferably from 0 to 50. The value of n is preferably in the range from 1 to 75, more preferably from 1 to 40 and most preferably from 1 to 10. The value of v is preferably in the range from 1 to 100, more preferably from 1 to 50 and most preferably from 1 to 40.

Examples of olefinically unsaturated monomers which are suitable for use for [A] in Formula (1) include but are not limited to styrene, α-methyl styrene; acrylonitrile, methacrylonitrile; vinyl esters for example vinyl acetate, vinyl propionate, vinyl laurate; vinyl esters of versatic acid for example VeoVa™ 9 and VeoVa™ 10 (available from Resolution Performance Products), vinyl ethers of heterocyclic vinyl compounds, in particular, esters of acrylic acid and methacrylic acid. Olefinically unsaturated monomers with additional functionality for subsequent crosslinking and/or adhesion promotion may also be used in the present invention. Examples of such monomers include diacetone acrylamide, acetoacetoxy ethyl methacrylate, glycidyl methacrylate, 2-hydroxy ethyl(meth)acrylate, 4-hydroxy butyl(meth)acrylate, 3-hydroxy propyl(meth)acrylate, hydroxy stearyl (meth)acrylate and 2-hydroxy ethyl(meth)acrylate.

Examples of olefinically unsaturated monomers suitable for use for [B] in Formula (1) include but are not limited to vinyl polyethers of ethylene or propylene oxide, for example hydroxypolyethoxy (5) polypropoxy (5) monoallyl ether (BX-AA-E5P5 available from Bimax Chemicals Ltd), methoxypolyethyleneglycol 350 methacrylate (available under the trade name from Laporte), methoxypolyethyleneglycol 550 methacrylate (available under the trade names Bisomer MPEG 350MA and Bisomer MPEG 550MA from Laporte), methoxypolyethyleneglycol 350 acrylate, polyethyleneglycol (6) methacrylate PEM6 and polyethyleneglycol (6) acrylate PEA6.

Examples of olefinically unsaturated monomers suitable for use for [D] monomer in Formula (1) include but are not limited to, N,N-diethyl amino ethyl(meth)acrylate, N,N-dimethyl amino ethyl(meth)acrylate, N,N-dipropyl amino ethyl(meth)acrylate, N,N-diethyl amino ethyl(meth)acrylamide, N,N-dimethyl amino ethyl(meth)acrylamide, tertiary butyl amino ethyl methacrylate, N,N-dimethyl amino propyl (meth)acrylamide, N,N-dimethyl amino propyl(meth)acrylate, 4-vinyl pyridine, 2-vinyl pyridine, vinyl imidazole, N,N-dimethyl amino methyl styrene, 4-amino styrene, N,N-dimethyl amino styrene and amino methyl styrene. Basic amine bearing monomers suitable for [D] can be polymerised either as the free amine, as a protonated salt or as a quaternised amine salt, for example, basic quaternary ammonium monomers include N,N-diethyl amino ethyl (meth)acrylate, N,N-dimethyl amino ethyl(methyl)acrylate, N,N-dipropyl amino ethyl(meth)acrylate, N,N-diethyl amino ethyl(meth)acrylamide, N,N-dimethyl amino ethyl (meth)acrylamide, tertiary butyl amino ethyl methacrylate, N,N-dimethyl amino propyl(meth)acrylamide, N,N-dimethyl amino propyl(meth)acrylate, 4-vinyl pyridine, 2-vinyl pyridine, vinyl imidazole, N,N-dimethyl amino methyl styrene, 4-amino styrene, N,N-dimethyl amino styrene and amino methyl styrene, N,N-dimethyl amino ethyl acrylate methyl chloride quaternary salt (available from Ciba Specialty Chemicals as AGEFLEX FM1Q80BC) and N,N-dimethyl amino ethyl acrylate benzyl chloride quaternary salt (available from Ciba Specialty Chemicals as AGEFLEX FA1Q80BC).

Preferred basic co-polymers suitable for use in the present invention are based on acrylic co-polymers, that is co-polymers based on acrylic or methacrylic esters.

Preferably [A], [B] and [D] in Formula (1) have the Formulae (13), (14) and (15) respectively, wherein:

[A] is of Formula (13),

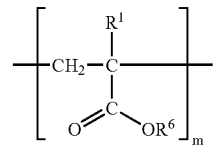

Formula (13)

[B] is of Formula (14), and

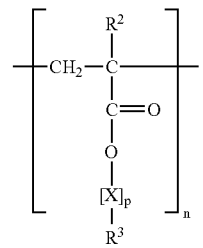

Formula (14)

[D] is of Formula (15),

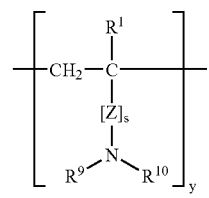

Formula (15)

wherein:

$R^6$ is $C_{1-10}$-alkyl, more preferably $C_{2-4}$-alkyl optionally substituted by a ketone, ether, —OH, epoxide, silanes or keto ester group;

$R^9$ and $R^{10}$ may be the same or different and are each independently H, optionally substituted $C_{1-10}$-alkyl or $C_{3-8}$-cycloalkyl; and $R^1$, $R^2$, $R^3$, m, n, y, p, s, [Z] and [X] are as hereinbefore defined.

Most preferably $R^9$ and $R^{10}$ are H or unsubstituted $C_{1-6}$-alkyl, especially unsubstituted $CH_3$ or $C_2H_5$.

When [D] is present as a quaternised salt it is preferably of Formula (16):

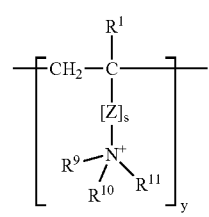

Formula (16)

$R^9$, $R^{10}$, Z, $R^1$ and s are previously hereinbefore described; and $R^{11}$ is optionally substituted $C_{1-10}$-alkyl, $C_{3-8}$-cycloalkyl. Most preferably, $R^{11}$ is unsubstituted $C_{1-10}$-alkyl or $C_{1-5}$-alkyl.

Preferred olefinically unsaturated monomers which may be used for [A] in Formula (13) include methyl acrylate, methyl methacrylate, ethyl acrylate, ethyl methacrylate, n-butyl acrylate, n-butyl methacrylate, 2-ethylhexyl acrylate, 2-ethylhexyl methacrylate, isopropyl acrylate, isopropyl methacrylate, n-propyl acrylate, n-propyl methacrylate, t-butyl methacrylate, 2-ethylhexyl methacrylate, isobornyl methacrylate, cyclohexyl methacrylate and the corresponding acrylates. Methacrylates or acrylates having optional substitution on $R^6$ such as for example epoxide, alkyl ether and aryl ether groups, hydroxyalkyl groups for example hydroxyethyl, hydroxy propyl or hydroxy butyl and modified analogues may also be employed as part of [A] in Formula (13). Ketofunctional monomers such as the acetoacetoxy esters of hydroxyalkyl acrylates and methacrylates such as acetoacetoxyethyl methacrylate, as well as silane functional monomers such as 2-(trimethylsiloxy) ethyl methacrylate may also be used. The advantages of using a functionalised monomer is to provide subsequent crosslinkability or adhesion promotion in the resulting basic co-polymer.

Examples of preferred acrylic monomers which may be used for [B] in Formula (14) include methoxypolyethyleneglycol 350 methacrylate, methoxypolyethyleneglycol 550 methacrylate (available under the trade name Bisomer MPEG 350MA and Bisomer MPEG 550MA from Laporte), methoxypolyethyleneglycol 350 acrylate and polyethyleneglycol (6) methacrylate PEM6 and polyethyleneglycol (6) acrylate PEA6.

Examples of preferred acrylic monomers which may be used for [D] in Formula (15) include N,N-diethyl amino ethyl(meth)acrylate, N,N-dimethyl amino ethyl(meth)acrylate and the quaternised or protonated salts thereof.

As illustrated in FIG. (1) the basic co-polymer of the present invention comprises a vinyl backbone with pendant side-chains. The basic co-polymer preferably comprises from 0% to 25% by weight of [A], from 30% to 70% by weight of [B] and from 5% to 50% of [D].

The basic co-polymers used in the present invention may be prepared by any co-polymerisation method known in the art. Preferably, the co-polymerisation is carried out in water, an organic solvent or a mixture of water and organic solvent using a free radical initiator. Suitable free-radical-yielding initiators include inorganic peroxides such as potassium, sodium or ammonium persulphate, hydrogen peroxide, or percarbonates; organic peroxides, for example acyl peroxides, including benzoyl peroxide, alkyl hydroperoxides for example t-butyl hydroperoxide and cumene hydroperoxide; dialkyl peroxides such as di-t-butyl peroxide; peroxy esters such as t-butyl perbenzoate and mixtures thereof may also be utilised. The peroxy compounds are in some cases advantageously used in combination with suitable reducing agents (redox systems) such as sodium or potassium pyrosulphite or bisulphite, and iso-ascorbic acid. Azo compounds such as azoisobutyronitrile or dimethyl 2,2-azo bis-isobutylate may also be used. Metal compounds such as iron.ethylene diamine tetracetic acid (EDTA) may also be usefully employed as part of the redox initiator system. Other free radical initiators include cobalt chelate complexes and particularly Co(II) and Co(III) complexes of porphyrins, dioximes and benzildioxime diboron compounds. It is also possible to use an initiator system partitioning between the aqueous and organic phases, for example a combination of t-butyl hydroperoxide, iso-ascorbic acid and iron ethylene diamine tetracetic acid. Preferred initiators comprise azo compounds for example azo-iso-butyronitrile or dimethyl 2,2'-azo bis-isobutylate and peroxides such as hydrogen peroxide or benzoyl peroxide. The amount of initiator or initiator system conventionally used is for example within the range from 0.05 to 6 weight % more preferably from 0.1 to 3 weight % and most preferably from 0.5 to 2 weight % based on the total amount of vinyl monomers used.

The organic solvent is preferably a polar organic solvent and may be a ketone, alcohol or an ether. Examples of suitable polar solvents include: methyl ethyl ketone, acetone, methyl isobutylketone, butyl acetate, ethoxyethylacetate, methanol, ethanol, n-propanol, iso-propanol, n-butanol, amyl alcohol, diethylglycol mono-n-butyl ether and butoxyethanol. Alternatively, the polar organic solvent may be used with a non-polar organic liquid.

Suitable non-polar organic solvents include: toluene-xylene mixtures and methylenechloride-dimethylformamide mixtures. The copolymerisation reaction is more preferably carried out in aqueous alcoholic solvents for example, methanol, ethanol, n-propanol, iso-propanol, n-butanol, amyl alcohol, diethylglycol or butoxyethanol, most preferably aqueous ethanol mixtures.

When prepared by solution polymerisation the number average molecular weight (Mn) of the polymer is typically in the range 5,000 to 200,000, more preferably 10,000 to 50,000.

The basic co-polymers of the present invention may also be made by aqueous emulsion or suspension polymerisation (as described in *Principles of Polymerisation*, G Odian, Wiley, Interscience $3^{rd}$ edition, 1991), in which case the value of Mn may be and in the range 20,000 to 500,000.

According to the present invention a preferred anti-microbial agent for use in a composition with a basic co-polymer as previously described comprises an antibacterial agent, more preferably a linear polymeric biguanide which is a mixture of polymer chains in which the individual polymer chains, excluding the terminating groups are of Formula (6) or a salt thereof as hereinbefore described. A preferred linear polymeric biguanide for use in the present invention is poly(hexamethylenbiguanide) hydrochloride (PHMB) available from Avecia Limited under the trade name Vantocil™IB.

The amount of polymeric biguanide used in the composition of the present invention relative to the amount of basic co-polymer is dependent upon the end use of the composition, the conditions under which it will be stored and the nature of the surface to which the composition is to be applied. The weight ratio of the linear polymeric biguanide to basic co-polymer in the composition may vary over wide limits for example from 100:1 to 1:1000, more preferably from 20:1 to 1:500.

It is especially preferred that the ratio of linear polymeric biguanide group to basic co-polymer in the anti-microbial composition is from 1:100 to 1:200.

The concentration of linear polymeric biguanide, for example poly(hexamethylene biguanide) (PHMB) used in the composition of the present invention is in the range from 0.001 weight % to 25 weight %, preferably from 0.005 weight % to 10 weight %, and especially from 0.01% to 5 weight %. The pH of the composition is typically chosen so that it is most appropriate for a particular application and is preferably in the range from pH 1 to 12 most preferably from pH 3 to 9.

The composition of the present invention may also contain other additives depending upon the particular use intended for the composition. Additional components optionally included in the composition may be for example additional polymeric materials, detergents, botanical extracts, perfumes, fragrances, thickeners, humectants, anti-corrosion agents, surfactants, colourants, chelating agents, buffers, acidity and alkalinity regulators, wetting agents, sequestering agents, hydrotropes, adjuvants, anti-soil agents and enzymes.

For ease of handling and dosing, it is generally convenient to combine the linear polymeric biguanide and basic co-polymer as a formulation with a suitable carrier. The carrier may be a solid but is preferably a liquid and the formulation is preferably a solution, suspension or emulsion of the antimicrobial composition in the liquid.

Whilst water is the preferred carrier for the composition, it is possible that other solvents such as water miscible organic solvents may also be present in the composition. Examples of suitable water-miscible organic solvents include glycols such as ethylene glycol, propylene glycol, dipropylene glycol; methanol, ethanol, propan-1-ol, propan-2-ol, $C_{1-6}$-alkyl esters for example butylethyl acetate, pentyl acetate, N-methyl-2-pyrrolidone and lower $C_{1-4}$-alkyl carbitols such as methyl carbitol. Preferred water-miscible organic solvents are glycols with 2 to 6 carbon atoms, poly-alkylene glycols with 4 to 9 carbon atoms or mono $C_{1-4}$-alkyl ethers of glycols with 3 to 13 carbon atoms. The most preferred water-miscible organic solvents are propylene glycol, ethyl hexyl glycol, ethanol, butyl ethyl acetate or pentyl acetate.

Therefore according to a second aspect of the present invention there is provided a formulation comprising:
(i) a linear polymeric biguanide;
(ii) a basic co-polymer; and
(iii) a carrier.

A preferred formulation of the final diluted application liquor according to a second aspect of the invention comprises from 0.01 to 5% by weight linear polymeric biguanide, more preferably from 0.1 to 1% by weight linear polymeric biguanide in the form of poly(hexamethylene biguanide) hydrochloride (PHMB). The amount of basic co-polymer in the formulation is preferably from 0.01 to 50% by weight, especially from 0.1 to 25% by weight. The preferred carriers are water or water/alcohol mixtures. The pH of the formulation is typically chosen to be most appropriate for the application and is preferably in the range of from pH 1 to 12. Most preferably the pH of the formulation is in the range of from 3 to 9. An especially preferred formulation according to the second aspect of the present invention comprises a diluted application solution containing 0.5% by weight poly(hexamethylene biguanide) hydrochloride (PHMB) and from 2 to 15% by weight basic co-polymer in the form of an aqueous solution.

The formulation may also contain other additives depending upon the particular use intended for the composition. Additional additives optionally included in the formulation are for example those disclosed for use in compositions according to the first aspect of the present invention.

During the course of the present studies it has been found that when a composition comprising an anti-microbial agent, for example a linear polymeric biguanide and a basic co-polymer is applied to a surface a sustained anti-microbial effect is achieved against a broad range of micro-organisms including gram positive bacteria, gram negative bacteria, pathogenic bacteria, yeasts, fungi and algae. Therefore, according to a further aspect of the present invention there is provided a method of treating a surface which comprises treating the surface with a composition or a formulation as hereinbefore described with reference to the first and second aspects of the present invention.

The preferred anti-microbial agent, poly(hexamethylene biguanide) hydrochloride, may be the only microbiologically active compound present in the composition or formulation. Alternatively, other microbiologically active compounds may also be present in combination with the polymeric biguanides. Examples of other microbiologically active compounds include for example: quaternary ammonium compounds for example, N,N-diethyl-N-dodecyl-N-benzylammonium chloride, N,N-dimethyl-N-octadecyl-N-(dimethyl benzyl)ammonium chloride, N,N-dimethyl-N,N-didecylammonium chloride, N,N-dimethyl-N,N-didodecylammonium chloride; N,N,N-trimethyl-N-tetradecylammonium chloride, N-benzyl-N,N-dimethyl-N-($C_{12}$-$C_{18}$ alkyl)ammonium chloride, N-(dichlorobenzyl)-N,-N-dimethyl-N-dodecylammonium chloride, N-hexadecylpyridinium chloride, N-hexadecyl pyridinium bromide, N-hexadecyl-N,N,N-trimethylammonium bromide, N-dodecyl pyridinium chloride, N-dodecylpyridinium bisulphate, N-benzyl-N-dodecyl-N,N-bis(beta-hydroxyethyl)ammonium chloride, N-dodecyl-N-benzyl-N,N-dimethylammonium chloride, N-benzyl-N,N-dimethyl-N-($C_{12}$-$C_{18}$ alkyl)ammonium chloride, N-dodecyl-N,N-dimethyl-N-ethylammonium ethylsulphate, N-dodecyl-N,N-dimethyl-N-(1-naphthylmethyl)ammonium chloride, N-hexadecyl-N,N-dimethyl-N-benzylammonium chloride, N-dodecyl-N,N-dimethyl-N-benzylammonium chloride or 1-(3-chloroallyl)-3,5,7-triaza-1-azonia-adamantane chloride, cocoalkylbenzyl-dimethylammonium, tetradecylbenzyldimethyl ammonium chlorides, myristyltrimethyl ammonium or cetyltrimethylammonium bromides, monoquaternary heterocyclic amine salts such as laurylpyridinium, cetylpyridinium or ($C_{12}$-$C_{14}$)alkyl benzylimidasolium chlorides; urea derivatives for example, 1,3-bis(hydroxymethyl)-5,5-dimethylhydantoin, bis(hydroxymethyl)urea, 3-(3,4-dichlorophenyl)-1,1-dimethylurea (Diuron), 3-(4-isopropylphenyl)-1,1-dimethylurea, tetrakis(hydroxymethyl)-acetylenediurea, 1-(hydroxymethyl)-5,5-dimethylhydantoin or imidazolidinylurea; amino compounds for example, 1,3-bis(2-ethyl-hexyl)-5-methyl-5-aminohexahydro-pyrimidine, hexamethylenetetramine, 1,3-bis(4-aminophenoxy) propane, dodecylamine or 2-[(hydroxymethyl)-amino] ethanol; imidazole derivatives for example 1[2-(2,4-dichloro-phenyl)-2-(2-propenyloxy)ethyl]-1H-imidazole or 2-(methoxycarbonyl-amino)-benzimidazole (Carbendazim); nitrile compounds for example, 2-bromo-2-bromomethyl-glutaronitrile, 2-chloro-2-chloro-methylglutaro-nitrile, 1,2-dibromo-2,4-dicyanobutane or 2,4,5,6-tetrachloro-1,3-benzenedicarbonitrile (Chlorothalonil); thiocyanate derivatives for example methylene(bis)thiocyanate or 2-(thiocyanomethylthio)-benzothiazole; tin compounds or complexes for example, tributyltinoxide chloride, naphthoate, benzoate or 2-hydroxybenzoate; isothiazolin-3-ones, for example 4,5-trimethylene-4-isothiazolin-3-one, 2-methyl-4,5-trimethylene-4-isothiazolin-3-one, 2-methyl-4-isothiazolin-3-one (MIT), 5-chloro-2-methyl-4-isothiazolin-3-one (CM IT), 2-octylisothiazolin-3-one (OIT) or 4,5-dichloro-2-octyl4-isothiazolin-3-one (DCOIT); benzisothiazolin-3-one compounds for example 1,2-benzisothiazolin-3-one (BIT), 2-methylbenzisothiazolin-3-one, 2-n-butylbenzisothiazolin-3-one, N-ethyl, N-n-propyl, N-n-pentyl, N-cyclopropyl, N-isobutyl, N-n-hexyl, N-n-octyl, N-n-decyl and N-tert-butyl1,2-benzisothiazolinone; thiazole derivatives for example, 2-(thiocyano methylthio)-benzthiazole or mercaptobenzthiazole; nitro compounds for example, tris(hydroxymethyl)nitromethane, 5-bromo-5-nitro-1,3-dioxane or 2-bromo-2-nitropropane-1,3-diol(Bronopol); iodine compounds, for example tri-iodo allyl alcohol; aldehydes and aldehyde release agents, for example glutaraldehyde (pentanedial), formaldehyde or glyoxal; amides for example chloracetamide, N,N-bis(hydroxymethyl)chloracetamide, N-hydroxymethyl-chloracetamide or dithio-2,2-bis(benzmethylamide); guanidine derivatives for example 1,6-hexamethylene-bis[5-(4-chlorophenyl)biguanide], 1,6-hexamethylene-bis[5-(4-chlorophenyl)guanide], bis(guanidinooctyl) amine triacetate, 1,6-D-(4'-chlorophenyidiguanide)-hexan (Chlorhexidine), polyoxyalkylene-guanidin-hydrochloride, polyhexamethyleneguanidine hydrochloride (PHMG), poly-(2-(2-ethoxy) ethoxyethyl guanidium chloride (PEEG) or dodecyl guanidine hydrochloride; thiones for example 3,5-dimethyltetrahydro-1,3,5-2H-thiodiazine-2-thione; sulphamides, for example N-dimethyl-N'-phenyl-(fluorodichloromethylthio)sulphamide (Preventol A4); triazine derivatives for example hexahydrotriazine, 1,3,5-tri-(hydroxyethyl)-1,3,5-hexahydrotriazine, 6-chloro-2,4-diethyl-amino-s-triazine or 4-cyclopropylamino-2-methylthio-6-t-butylamino-s-triazine (Irgarol); oxazolidine and derivatives thereof for example bis-oxazolidine; furan and derivatives thereof for example 2,5-dihydro-2,5-dialkoxy-2,5-dialkylfuran; carboxylic acids and the salts and esters thereof for example sorbic acid and 4-hydroxybenzoic acid; phenol and derivatives thereof for example 5-chloro-2-(2,4-dichlorophenoxy)phenol, thio-bis(4-chlorophenol), 2-phenylphenol, 2,4,5-trichloro-2'-hydroxy-diphenylether (Triclosan) and 4-chloro-3,5-dimethyl-phenol (PCMX); sulphone derivatives for example diiodomethyl-paratolylsulphone, 2,3,5,6-tetrachloro-4-(methylsulphonyl)pyridine or hexachlorodimethylsulphone; imides for example, N-(fluorodichloromethylthio)phthalimide (Preventol A3), N-(trichloromethylthio)phthalimide (Folpet) or N-(trichloromethyl)thio4-cyclohexene-1,2-dicarboxyimide (Captan); thioamides the metal complexes and salts thereof for example dimethyidithiocarbamate, ethylenebisdithiocarbamate, 2-mercapto-pyridine-N-oxide (especially the 2:1 zinc complex and the sodium salt); azole fungicides for example hexaconazole, tebuconazole, propiconazole, etaconazole or tetraconazole; strobilurins, for example methyl-(E)-2-[2-(6-(2-cyanophenoxy)pyrimidin-4-yloxy)phenyl]-3-methoxyacrylate (Azoxystrobin), methyl-(E)-methoxyimino[α-(o-tolyloxy)-o-tolyl]acetate, N-methyl-(E)-methoxyimino[2-(2,5-dimethylphenoxymethyl) phenyl] acetamide, N-methyl-(E)-2-methoxyimino-2-(2-phenoxyphenyl)acetamide (Metominostrobin) or Trifloxystrobin; amides for example dithio-2,2'-bis(benzmethylamide) (Densil P) or 3,4,4'-Trichlorocarbanilide (Triclocarban); carbamates for example 3-lodopropargyl-N-butylcarbamate (IPBC), 3-lododpropargyl-N-phenylcarbamate (IPPC) or Bis-(diemthylthiocarbamoyl)-disulphide (Thiram); pyridine derivatives for example sodium or zinc salt of 2-mercaptopyridine-N-oxide (Sodium or Zinc pyrithione); compounds with activated halogen groups for example tetrachloroisophthalodintril (Chlorthalonil), 1,2-Dibromo-2,4-dicyanobutane (Tektamer 38); orgα-nometallic compounds for example 10,10'-Oxybisphenoxyarsine (OBPA).

The amount of additional anti-microbial compound(s) in the composition will depend upon the nature of the additional anti-microbial compound and the surface to be protected against microbial degradation.

It is further possible to use combinations of two or more basic co-polymers of Formula (1) as previously described in combination with the anti-microbial agents as previously described in the compositions or formulations of the present invention for disinfecting surfaces found in for example household, industrial or institutional areas. The treatment can be applied to a wide variety of surfaces as exemplified as follows but not limited thereto. Surface applications include for example, walls, floors, work surfaces, equipment found in domestic, industrial, food processing, sanitary, health and medical environments, skin, synthetic and natural textiles and fibres, stainless steel, polymer and polymeric coatings such as vinyl, polyvinyl chloride, polypropylene and polyethylene, wood, glass, rubber, paint surfaces, stone, marble, grouts, packaging and films.

As hereinbefore described the anti-microbial compositions and formulations according to the first and second aspects of the invention significantly reduce the levels of micro-organisms on surfaces treated with the anti-microbial compositions, which activity is sustained over a period of time.

According to a fourth aspect of the present invention there is therefore provided the use of a composition according to the first aspect of the present invention or the use of a formulation according to a second aspect of the present invention for the treatment of surfaces.

It has also been found that the basic co-polymers described above in relation to the first aspect of the present invention may also be used in combination with fungicidal compounds. It has surprisingly been found that the fungicidal compounds are also controllably released from the basic co-polymers over time thereby providing sustained and effective anti-fungal control.

Fungicides

A wide variety of fungicides can be used in combination with the basic co-polymers described above. Examples of such fungicides include but are not limited to: methoxyacrylates, for example, methyl (E)-2-2-6-(2-cyanophenoxy)pyrimidin4-yloxyphenyl-3-methoxyacrylate; carboxamides and acetamides for example, 5,6-dihydro-2-methyl-N-phenyl-1,4-oxathiin-3-carboxamide and 2-cyano-N-[(ethylamino)carbonyl]-2-(methoxyamino)acetamide; aldehydes, for example cinnamaldehyde and 3,5-dichloro-4-hydroxy-benzaldehyde; pyrimidines, for example 4-cyclopropyl-6-methyl-N-phenyl-2-pyrimidinamine and 5-butyl-2-ethy-lamino-6-methylpyrimidin-4-ol; morpholines for example, (E,Z)-4-[3-(4-chlorophenyl)-3-(3,4-dimethoxyphenyl)acryloyl]morpholine and $C_{11-14}$-alkyl-2,6-dimethylmorpholine-homologues such as (Tridemorph) and (±)-cis-4-[3-tert-butylphenyl)-2-methylpropyl]-2,6-dimethylmorpholine (Fenpropimorph); guanidines, for example 1-dodecylguanidine acetate; pyrroles, for example 4-(2,2-difluoro-1,3-benzodioxol-4-yl)-1Hpyrrole-3-carbonitrile; imidazoles and benzimidazoles, for example 1-[2-(2,4-dichlorophenyl)-2-(2-propenyloxy)ethyl]-1H-imidazole, 3-(3,5-dichlorophenyl)-N-(1-methylethyl)-2,4-dioxo-1-imidazolidinecarboxamide, Carbendazim (MBC), Benomyl, Fuberidazole, Thiabendazole, 1-(N-propyl-N-(2-(2,4,6-(trichlorophenoxy)-ethyl)-carbamoyl)-imidazole (prochloraz) and salts thereof; alanine derivatives for example, N-(2,6-dimethylphenyl)-N-(methoxyacetyl)-D-alaninemethyl ester and N-(2,6-dimethylphenyl)-N-(methoxyacetyl)-DL-alaninemethyl ester; triazoles for example, 1-[[2-(2,4-dichlorophenyl)-4-propyl-1,3-dioxolan-2-yl]methyl]-1H-1,2,4-triazole, H-1,2,4-triazole-1-ethanol-alpha-[2-(4-chlorophenyl)-ethyl]-alpha-(1,1-dimethylethyl), 1-[2-(2,4-dichlorophenyl)-1,3-dioxolan-2-yl-methyl]-1H-1,2,4-triazole [azaconazole], 1-(4-chlorophenoxy)-3,3-dimethyl-1-(1H-1,2,4-triazol-1-yl)-2-butanone (triadimefone), β-(4-chlorophenoxy)-α-(1,1-dimethyl-ethyl)-1H-1,2,4-triazole- 1-ethanol (triadimenol), α-[2-(4-chlorophenyl)-ethyl]-α-(1,1-dimethylethyl)-1H-1,2,4-triazole-1-ethanol (tebuconazole), (RS)-2-(2,4-dichlorophenyl)-1-(1H-1,2,4-triazol-2-yl)-hexan-2-ol (hexaconazole), 1-[[2-(2,4-dichlorophenyl)-4-n-propyl-1,3-dioxolan-2-yl]-methyl]-1-H-1,2,4-triazole (propiconazole). Triazole fungicides can be present not only in the form of free bases but also in the form of their metal salt complexes or as acid addition salts, for example salts of metals of main groups II to IV and sub-groups I and II and IV to VII of the periodic table of elements, examples of which may include copper, zinc, manganese, magnesium, tin, iron, calcium, aluminium, lead, chromium, cobalt and nickel. Possible anions of the salts are those which are preferably derived from the following acids: hydrohalic acids, for example, hydrochloric acid, hydrobromic acid, phosphoric acid, nitric acid and sulphuric acid. In cases where the compound has an asymmetric carbon atom, isomers and isomer mixtures are also possible. Further examples of fungicides include: oxazolidines for example, 3-(3,5-dichlorophenyl)-5-methyl-5-vinyl-1,3-oxazolidine-2,4-dione; p-hydroxybenzoates for example, benzoic acid, paramethylbenzoic acid, salicylic acid, dehydroacetic acid and salts thereof; isothiazolinones, for example 2-methyl-isothiazolin-3-one, 5-chloro-2-methylisothiazolin-3-one, 4,5-dichloro-N-octyl-isothiazolin-3-one, 2-n-octyl4-isothiazolin-3-one, cyclopentenisothiazolinones; benzisothiazolin-3-one compounds for example 2-methylbenzisothiazolin-3-one, 2-n-butylbenzisothiazolin-3-one N-ethyl, N-n-propyl, N-n-pentyl, N-n-hexyl, N-cyclopropyl, and N-isobutylbenzisothiazolin-3-one; quaternary ammonium compounds for example, cocoalkylbenzyl-dimethylammonium, tetradecylbenzyldimethylammonium chlorides, myristyltrimethyl ammonium, cetyltrimethylammonium bromides, monoquaternary heterocyclic amine salts, laurylpyridinium, cetylpyridinium or ($C_{12}$-$C_{14}$)alkyl benzylimidasolium chlorides, benzyldimethyltetradecylammoniumchloride, benzyl-dimethyl-dodecylammoniumchloride, didecyl-dimethyl-ammoniumchloride, alkyl ammonium halides, for example lauryl trimethyl ammonium chloride and dilauryl dimethyl ammonium chloride, alkyl aryl ammonium halides such as octadecyl dimethyl benzyl ammonium bromide, ethyl dimethyl stearyl ammonium chloride, trimethyl stearyl ammonium chloride, trimethyl cetyl ammonium chloride, dimethyl ethyl lauryl ammonium chloride, dimethyl propyl myristyl ammonium chloride, dinonyl dimethyl ammonium chloride, didecyl dimethyl ammonium chloride, diundecyl dimethyl ammonium chloride, didecyl dimethyl ammonium chloride, dinonyly ethyl ammonium chloride, dimethyl ethyl benzyl ammonium chloride, 3-(trimethyxyosilyl) propyldidecylmethyl ammonium chloride, 3-(trimethyoxysilyl) propyloctadecycdimethyl ammonium chloride, dimethyl dioctyl ammonium chloride, didecyl dimethyl ammonium chloride, didodecyl dimethyl ammonium chloride, dimethyl ditetradecyl ammonium chloride, dihexadecyl dimethyl ammonium chloride, dimethyl dioctadecyl ammonium chloride, decyl dimethyl octyl ammonium chloride, dimethyl dodecyloctyl ammonium chloride, benzyl decyl dimethyl ammonium chloride, benzyl dimethyl dodecyl ammonium chloride, benzyl dimethyl tetradecyl ammonium chloride, decyl dimethyl (ethyl benzyl)ammonium chloride, decyl dimethyl(dimethyl benzyl)-ammonium chloride, (chlorobenzyl)-decyl dimethyl ammonium chloride, decyl-(decyl-(dichlorobenzyl)-dimethyl ammonium chloride, benzyl didecyl methyl ammonium chloride, benzyl didocyl methyl ammonium chloride, benzyl ditetradecyl methyl ammonium chloride, and benzyl dodecyl ethyl ammonium chloride; iodopropargyl derivatives for example, 3-iodo-2-propynyl-N-n-butylcarbamate (IPBC), propyl 3-(dimethylamino)propylcarbamate-hydrochlorides, 3-iodo-2-propynyl-N-n-propyl carbamate, 3-iodo-2-propynyl-N-n-hexyl carbamate, 3-iodo-2-propynyl-N-cyclohexylcarbamate, 3-iodo-2-propynyl-N-phenyl carbamate and thiocarbamates for example S-ethyl cyclohexyl(ethyl)thiocarbamate; sulphenamides for example, Dichlofluanid (Euparen), Tolylfluarid (Methyleuparen), Folpet, Fluorfolpet, tetramethyidiuramdisulfides (TMTD) and 2-methylbenzamide-1,1'disulphide (available as Densil™P from Avecia Ltd); thiocyanates for example, thiocyanatomethylthiobenzothiazole (TCMTB) and methylenbisthiocyanate (MBT); phenols for example, o-phenylphenol, tribromphenol, tetrachlorphenol, pentachlorphenol, 2-phenoxyethnaol 3-methyl-4-chlorphenol, dichlorophen and chlorophen; iododeriatives for example, diiodmethyl-p-arylsulfone and diiodmethyl-p-tolylsulfone; bromoderivatives for example, 2-bromo-2-nitro-1,3-propanediol(Bronopol) and 1,2-dibromo-2,4-dicyanobutane (Tektamer™38); pyridines for example, 1-hydroxy-2-pyridinthione or pyridine-2-thiol-1-oxide (sodium, iron, manganese or zinc salts commercially available under the trademark Sodium Omadine from Arch Chemicals), tetrachlor-4-methylsulphonylpyridine, 2,3,5,6 tetrachloro-4(methyl sulphonyl)pyridine (available from Avecia Limited as Densil™ S); metallic soaps for example, tin, copper, zinc-naphthenate, octoate, 2-ethylhexanoate, oleate, -phosphate, benzoate, or oxides for example TBTO, $Cu_2O$, CuO and ZnO; organic tin-derivatives, for example tributyltin naphthenate or tributyl tinoxide; dialkyldithiocarbamates for example sodium and zinc salts of dialkyldithiocarbamates; nitriles for example 2,4,5,6-tetrachlorisophthalonitrile (Chlorthalonil); benzthiazoles, for example 2-mercaptobenzothiazoles; Dazomet; chinolines for example 8-hydroxyquinoline; Tris-N-(cyclohexyldiazeniumdioxy)-aluminum, N-(cyclohexyldiazeniumdioxy)-tributyl tin or potassium salts and Bis-(N-cyclohexyl)diazinium (-dioxy-copper or aluminum); alkyl esters of parahydroxybenzoic acid particularly the methyl, ethyl, propyl and; 2,4,4'-trichloro-2-hydroxydiphenyl ether (available under the trade name Triclosan) or 4,4'-trichloro-2-hydroxydiphenyl ether available under the tradename Diclosan); formaldehyde release compounds for example hydantoins, N,N"-methylene bis[N'-(hydroxymethyl)-2,5-dioxo-4-imidazolidinyl]urea, Quaternium-15 and 1,3-dimethylol-5,5-dimethylhydantoin (DMDMH), N-(hydroxymethyl)-N-(1,3-dihydroxymethyl-2,5-dioxo-4-imidazolidinyl)-N'-(hydroxymethyl); urea and the cis isomer of 1-(3-chloroallyl)-3,5,7-triaza-1-azoniaadamantane chloride; benzylalcoholmono(poly)hemiformal, oxazolidine, hexahydro-s-triazine and N-methylolchloracetamid; cyclic thiohydroxamic acid compounds for example imidazolidine-2-thione, pyrrolinethione, pyrrolidinethione, isoindolinethione, 3-hydroxy-4-methylthiazol-2(3H)-thione, 3-hydroxy-4-phenylthiazol-2(3H)-thione, 3-hydroxy-4,5,6,7-tetrahydrobenzothiazol-2(3H)-thione, 5,5-dimethyl-1-hydroxy-4-imino-3-phenylimidazolidine-2-thione, 1-hydroxy-4-imino-3-phenyl-2-thiono-1,3-diazaspiro[4,5]-decane, 1-hydroxy-5-methyl-4-phenylimidazoline-2-thione, 4,5-dimethyl-3-hydroxythiazol-2(3H)-thione, 4-ethyl-3-hydroxy-5-methylthiazol-2(3H)-thione, 4-(4-chlorophenyl)-3-hydroxythiazol -2(3H)-thione, 3-hydroxy-5-methyl-4-phenylthiazol-2(3H)-thione, 1-hydroxypyrrolidin-2-thione, 5,5-dimethyl-1-hydroxypyrrolidin-2-thione and 2-hydroxy-2,3-dihyro-1H-isoindol-1-thione.

Preferred antifungal compounds include quaternary ammonium compounds, isothiazolione and benzisothiazolinone compounds, carbamates and pyridine compounds.

Therefore, according to a fifth aspect of the present invention there is provided a composition comprising:
(i) a fungicide; and
(ii) a basic co-polymer of Formula (1)

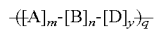  Formula (1)

wherein:
[A] is of Formula (9),

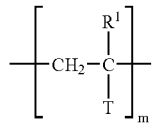  Formula (9)

[B] is of Formula (10),

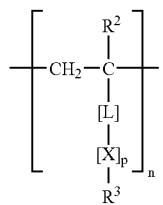  Formula (10)

and [D] is of Formula (12);

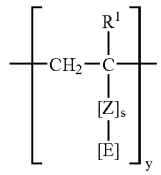  Formula (12)

wherein:
X is of Formula (11);

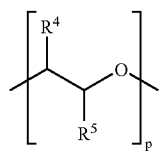  Formula (11)

wherein [A], [B] and [D] may occur in any order;
T is an optionally substituted substituent;
L and Z each independently is an optionally substituted linking group;
$R^1$, $R^2$ and $R^3$ are each independently H; $C_{1-20}$-alkyl or $C_{3-20}$-cycloalkyl;
$R^4$ and $R^5$ are each independently H or $C_{1-4}$-alkyl;

E is a basic substituent;
q is 15 to 1000;
m is 0 to 350;
n is 1 to 75;
y is 1 to 100;
s is 0 or 1;
p is 3 to 50; and provided that at least one of $R^4$ and $R^5$ is H and provided that $R^1$, $R^2$, $R^3$, T, L and Z do not contain an acidic group which can protonate E on [D].

In the fifth aspect of the present invention preferences for [A], [B], [D], m, n, y, q, T, L, X, Z, E, p, S, $R^1$, $R^2$, $R^3$, $R^4$ and $R^5$ are as hereinbefore described with reference to the first aspect of the present invention.

The invention is further illustrated by the following examples in which all parts are by weight unless otherwise stated.

Experimental Details

Preparation of Basic Co-polymer Example 1 (Table 1).

A glass reactor fitted with stirrer, nitrogen bleed, thermocouple and condenser was cleaned and dried prior to use.

An initiator solution was prepared using dimethyl 2,2' azobis isobutyrate (2.3 g) (0.01 moles) dissolved in solvent (97.3 g) (50/50 mixture of ethanol 600 gm and distilled water 600 g). A monomer solution containing solvent (307.2 g) dimethyl amine ethyl acrylate (125.8 g, 0.8 moles) and methoxy (polyethylene glycol 550) monomethacrylate (127 g, 0.2 moles) was prepared. Into the reactor was added solvent (515 g) followed by the monomer solution (560 g). The monomer solution was washed into the reactor with solvent (100 g). The reactor was heated to 75° C. using a Haake circulating water bath and was stirred at 180 rpm under a nitrogen blanket. At time zero initiator solution (25 g) was added to the reactor followed 30 minutes later by more initiator solution (50 g). The solution was left for 3 hours 30 minutes before increasing the reactor temperature to 80° C. On reaching the required temperature initiator solution (12.5 g) was added to the reactor and allowed to polymerise for a further two hours after which time the final aliquot of initiator solution (12.5 g) was added. After two hours the basic vinyl co-polymer solution was cooled and removed from the reactor.

The total time of polymerisation was eight hours. The final solution was water white and free of particulate matter. (Monomers and initiators were 100% concentrated). The basic vinyl comb type co-polymer was formed in greater than 99% yield.

The molecular weight of the basic co-polymer was determined using GPC columns with polyethylene oxide standards. NMR analysis was used to confirm the ratio of the monomer units [A], [B] and [D] and DMTA (Dynamic Mechanical Thermal Analysis) was used to determine the Tg of the vinyl basic co-polymer.

A similar procedure was used to prepare polymers 2 to 11 except that different levels of monomers [A], [B] and [D] were used as indicated in Table 1, with variations to either the molar ratio, or monomer used.

TABLE 1

Composition of Basic Co-polymers

| Polymer | Monomers [A] | [B] | [D] | Length of PEG/PPG Units[1] | Molar Ratio of Repeat Units [A]:[B]:[D] | | |
|---|---|---|---|---|---|---|---|
| 1 |  | PEG550MA | DMAEMA | 12 |  | 1 | 4 |
| 2 |  | PEG550MA | DMAEMAquat | 12 |  | 1 | 4 |
| 3 | MMA | PEG550MA | DMAEMAquat | 12 | 2 | 1 | 2 |
| 4 | MMA | PEG550MA | DMAEMA | 12 | 2 | 1 | 4 |
| 5 | MMA | PEG550MA | DMAEMA | 12 | 4 | 1 | 4 |
| 6 | MMA | PEG550MA | DMAEMA | 12 | 6 | 1 | 4 |
| 7 | MMA | PEG550MA | DMAEMA | 12 | 8 | 1 | 4 |
| 8 | MMA | PEG350MA | p-AminoSTY | 8 | 4 | 1 | 2 |
| 9 | i-BMA | PEG350MA | DMAEMA | 8 | 2 | 1 | 4 |
| 10 | MMA | PPG5MA | DMAEMA | 5 | 2 | 1 | 4 |
| 11 | MMA | PPG5MA | DMAEMA | 5 | 4 | 1 | 4 |

The value
[1] corresponds to (p) in formulae (10) and (11)
PEG550Ma Methoxypolyethyleneglycol monomethacrylate with 12–13 ethylene oxide units
MMA Methylmethacrylate.
DMAEMA 2-Dimethylaminoethyl methacrylate
DMAEMAquat 2-Dimethylaminoethyl methacrylate methyl chloride quaternary salt[2]
[2] IUPAC name is [2-(Methacryloyloxy)ethyl]trimethylammonium chloride
p-AminoSTY p-Amino Styrene
PPG5MA methoxypolypropylene glycol monomethacrylate with 5 propylene oxide units.

Basic Co-polymer Cloud Point Determination.

The cloud points of co-polymers (1 to 11 from Table 1) were determined by making up 1% by weight solutions of the polymers in distilled water. Each polymer solution was heated and stirred until it became cloudy. The stirred solution was then allowed to cool whilst the temperature was monitored. The temperature at which the solution became clear is the cloud point. The cloud point of Polymer 5 determined by this method was 55° C. (PEG550Ma content 38%).

FIG. 1 shows how the cloud point varies as a function of the MPEG550Ma content in polymers 4, 5, and 7.

FIG. 1 it can be concluded that for these basic co-polymers the cloud point increases as the MPEG550 content increases.

Preparation of Basic Co-polymer/Anti-microbial Agent Compositions

Compositions 1 to 25 were prepared by mixing a 20% aqueous solution of poly (hexamethylene biguanide) hydrochloride (PHMB) (5 g) (available from Avecia Limited as Vantocil™IB) to each of the polymers 1 to 5 from Table 1 as 20% solutions (in water/ethanol 1:1) in varying quantities as set out in Table 2. The compositions were allowed to stand for 24 hours before being applied to substrates such as glass or ceramic tiles. All of the compositions were low viscosity colourless transparent solutions, free from sediment and with excellent storage stability. Storage stability was tested by storing the compositions for 2 months at 52° C. and was considered excellent if the viscosity of the composition remained unchanged and there was no formation of precipitate or gel particles.

Preparation of Basic Co-polymer Composition with Various Biocides Looking at Antifungal Properties Using Polymer Example 5

Compositions 26-33 were prepared by mixing with various biocides. To a sample of the polymer solution the biocide was added at concentrations ranging from 0.1%-0.5% wt/wt on the total weight of the solution. The compositions were placed on a rotating mixer for 24 hours to form a homogeneous composition and then applied to substrates such as glass or ceramic tile. The compositions were of low viscosity and free from sediment.

TABLE 2

| Composition Number | Basic Vinyl Co-Polymer Number (Table 1) | Basic Vinyl Co-Polymer weight % | Polymeric Biguanide (PHMB)/other Biocide weight % |
|---|---|---|---|
| 1 | 1 | 41.2 | 58.8 |
| 2 | 1 | 50 | 50 |
| 3 | 1 | 48.4 | 41.6 |
| 4 | 1 | 74.4 | 25.6 |
| 5 | 1 | 78.3 | 21.7 |
| 6 | 1 | 82.3 | 17.3 |
| 7 | 1 | 83.3 | 16.7 |
| 8 | 1 | 87.8 | 12.2 |
| 9 | 1 | 95 | 5 |
| 10 | 2 | 50 | 50 |
| 11 | 2 | 83.3 | 16.7 |
| 12 | 2 | 95 | 5 |
| 13 | 3 | 50 | 50 |
| 14 | 3 | 83.3 | 16.7 |
| 15 | 3 | 95 | 5 |
| 16 | 4 | 83.3 | 16.7 |
| 17 | 4 | 95 | 5 |
| 18 | 5 | 83.3 | 16.7 |
| 19 | 5 | 95 | 5 |
| 20 | 6 | 90 | 10 |
| 21 | 7 | 90 | 10 |
| 22 | 8 | 90 | 10 |
| 23 | 9 | 90 | 10 |
| 24 | 10 | 90 | 10 |
| 25 | 11 | 90 | 10 |
| 26 | 5 | 99.9 | 0.1 of Biocide A |
| 27 | 5 | 99.8 | 0.2 of Biocide A |
| 28 | 5 | 99.8 | 0.2 of Biocide B |
| 29 | 5 | 99.5 | 0.5 of Biocide B |
| 30 | 5 | 99.9 | 0.1 of Biocide C |
| 31 | 5 | 99.8 | 0.2 of Biocide C |

TABLE 2-continued

| Composition Number | Basic Vinyl Co-Polymer Number (Table 1) | Basic Vinyl Co-Polymer weight % | Polymeric Biguanide (PHMB)/other Biocide weight % |
|---|---|---|---|
| 32 | 5 | 99.9 | 0.1 of Biocide D |
| 33 | 5 | 99.8 | 0.2 of Biocide D |

Biocide A n-Butyl 1,2, benzisothiazolin
Biocide B Dodecylethyldimethylammonium bromide
Biocide C 3-iodoprpargylbutyl carbamate
Biocide D 2-octylisothiazolin-3-one Measurement of the Release of Anti-bacterial Agent (PHMB) from Films of the Basic Co-Polymer PHMB/Compositions.

Calibration of Poly(hexamethvlene)biguanide (PHMB) Concentration By UV Spectrometry.

Firstly the UV absorbance at 236 nm of a known concentration of poly(hexamethylene biguanide) (PHMB) dissolved in water was measured (Perkin Elmer Lambda 900 UV/Vis/NIR Spectrophotometer). In a similar manner the UV absorbance at 236 nm was measured for a series of samples prepared from known dilutions of the original PHMB aqueous solution. A calibration curve for PHMB concentration in aqueous solution was produced (FIG. 2) by plotting UV absorbance against PHMB concentration.

Figure 2:
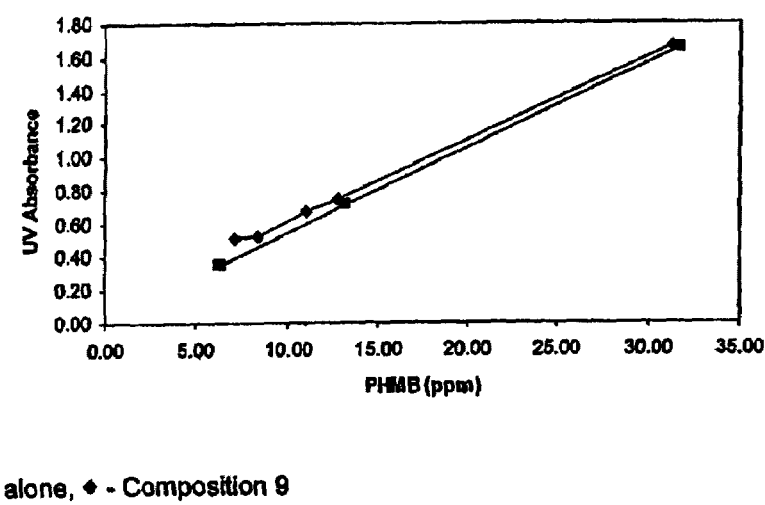
FIG. 2 shows a graph of an UV Spectroscopic Calibration Curve for Poly(hexamethylene biguanide) (PHMB) measured at 236 nm.

In addition a similar UV curve (FIG. 2) was produced for PHMB in the presence of a basic co-polymer composition 9. FIG. 2 showed that the presence of basic co-polymer did not significantly interfere with the determination of the PHMB concentration by this method.

General Method for the Measurement of the Rate of Poly (hexamethylene Biguanide) (PHMB) Release from Films of Co-polymer/PHMB Compositions 1 to 25 Using UV Analysis.

Basic co-polymer/PHMB Compositions 1 to 25 (Table 2) were separately applied to clean glass panels (150 mm×100 mm) and films of the composition were drawn down using a Sheen 250 μm draw down bar. The films were allowed to dry and the coating weight noted.

Each coated glass panel was immersed separately in distilled water (1 litre) in a 2 litre beaker and stirred at a constant speed using a magnetic stirrer.

Samples of water (approximately 5 cm$^3$) were taken from the beaker in duplicate at regular intervals over a one hour period.

The water samples were analysed using a UV spectrophotometer and the absorbance of each sample measured at a specific peak corresponding to the λ max of poly(hexamethylene biguanide) (PHMB). The measured absorbance was directly related to the concentration of the PHMB in the beaker.

Figure 3:
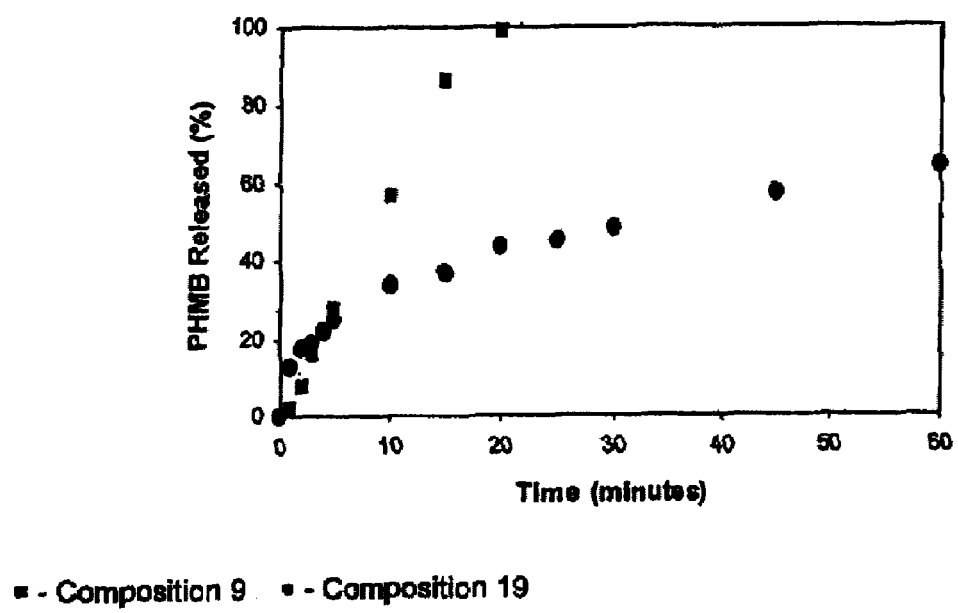
FIG. 3 shows a graph of the measurement of the release of PHMB from the PHMB/Basic Co-polymer.
Figure 4:
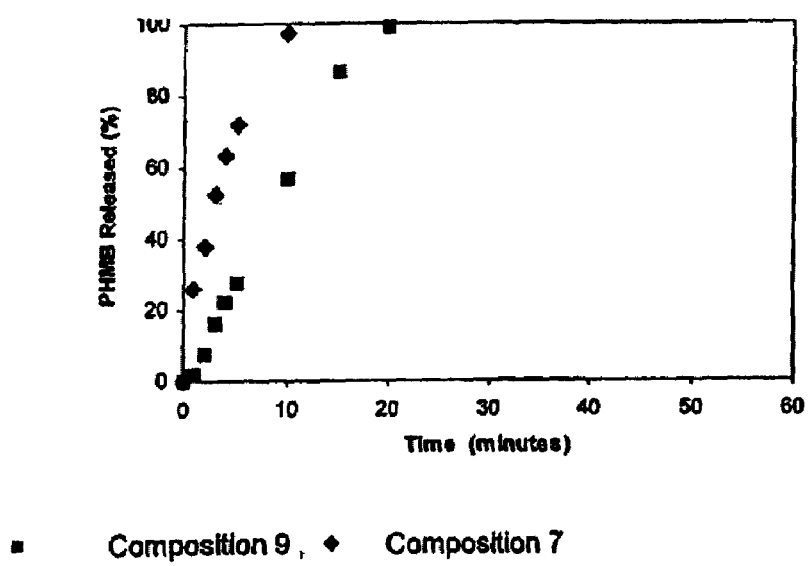
FIG. 4 shows a graph of the effect of PHMB loading on the release rate of PHMB from the PHMB/Basic co-polymer films.

Using the methodology described above the following release profiles (FIGS. 3 and 4) were generated:

From FIG. 4 it can be concluded that a film of composition 2 containing 16.7% by weight PHMB releases all its PHMB within 10 minutes whereas composition 1 with just 5% by weight PHMB takes 20 minutes to fully release all its PHMB.

Therefore, according to the present invention it was found that the rate of dissolution of poly(hexamethylene biguanide) from the basic co-polymer could be controlled according to the basic co-polymer structure and by the ratio of basic co-polymer to poly(hexamethylene biguanide).

Moreover, the above illustrates that stable basic co-polymer solutions in both water and water/ethanol mixture, can be prepared with polymeric biguanides such as poly(hexamethylene biguanide) hydrochloride.

Determination of Minimum Inhibitory Concentrations of PHMB/Basic Vinyl Co-polymer Compositions.

The intrinsic antimicrobial activity of compositions of Polymer 1 (from Table 1) with various levels of PHMB were evaluated by measuring Minimum Inhibitory Concentrations (MICs).

1. Bacteria (*Pseudomonas aeruginosa* ATCC 15442) were grown on nutrient agar for 16 to 24 hours at 37° C. (to give approximately 10$^9$ cells per ml).
2. A 0.1% (by volumn) inoculum was used to seed fresh medium and 100 μl was then added to each well of a microtitre plate, except for the first well which contained 200 μl.
3. Using doubling dilutions, the concentration of the compounds under investigation were varied in each well along the ordinate axis.
4. The presence or absence of growth was determined by visual inspection after 24 hours incubation at 37° C.

The MIC is the lowest concentration of the sample required to inhibit bacterial growth.

TABLE 3

Intrinsic Activity of Basic Co-polymer, Example 1[1] with PHMB.

| Composition Number | % By Weight of PHMB on Basic Co-polymer Example 1 | MIC versus *Pseudomonas aeruginosa* (ppm) |
|---|---|---|
|  | 100% PHMB (control) | 10 |
| 1 | 58.8 | 8 |
| 3 | 41.6 | 12 |
| 4 | 25.6 | 15 |
| 5 | 21.7 | 8 |
| 6 | 17.3 | 2 |
| 8 | 12.2 | 10 |

[1]for composition of Basic Co-polymer [1] see Table 1.

Experimental Determination of the Residual Bactericidal Activity of Basic Co-polymer/PHMB Formulations.

Basic co-polymer/PHMB compositions were prepared as previously described (Table 2).

The residual antibacterial activity of the samples was determined by the following methodology:

1. All compositions were diluted to 0.5% active ingredient (PHMB). A 50 μl aliquot of each sample was placed in a ceramic tile well and allowed to dry for approximately 1 hour.
2. Bacteria (*Ps.aeruginosa* ATCC 15442) were grown in nutrient broth at 37° C. for 16-20 hours.
3. An inoculum of approximately 10$^8$ organisms per ml was prepared in physiological saline (0.85% NaCl).
4. A 150 μl aliquot of bacterial inoculum was pipetted into the ceramic tile well previously coated by the PHMB/polymer composition, and incubated at room temperature.
5. After 5 minutes contact time the inoculum was removed by pipette and the number of surviving, viable organisms enumerated (samples were serially diluted in CEN neutraliser by 10$^2$, a 1 ml aliquot was added to 9 ml of impedance broth and the RABIT™ was used to enumerate bacterial cells).
6. The PHMB/polymer coated ceramic wells were then washed up to five times with 5 ml aliquots of sterile distilled water.

7. Following each washing step, the samples were re-inoculated with a 150 µl aliquot of bacterial inoculum.
8. As above the inoculum was removed after 5 minutes and the number of viable organisms enumerated by the method described above.

RABIT™ (Rapid Automated Bacterial Impedance Technique) measures the change in conductance of a bacterial suspension over time. Actively growing bacteria break down uncharged or weakly charged molecules in a defined media to give end products that are highly charged. The resultant increase in conductance can be directly related to bacterial concentration by the use of a calibration curve. (Further background relating to this known technique can be found in: Technical Reference Paper-RAB-03, Don Whitley Scientific, 14 Otley Road, Shipley, West Yorkshire, UK, BD17 7SE).

Table 4 summarises the sustained bactericidal activity of the basic co-polymers/PHMB formulations obtained using the above techniques.

TABLE 4

Sustained Bactericidal Activity of Basic Co-Polymers with Poly(hexamethylene) Biguanide (PHMB)

| Composition Number[1] | % PHMB by weight on basic co-polymer | Log reduction versus Ps. aeruginosa after 5 minutes contact time | | |
|---|---|---|---|---|
| | | No washes | 1 wash | 2 washes |
| Control | 100 | 6.6 | 4.6 | 0.2 |
| 5 | 21.7 | 7.1 | 6.2 | 1.3 |
| 6 | 17.3 | 7.1 | 6.2 | 1.3 |
| 10 | 50 | 6.7 | 6.8 | 1.4 |
| 11 | 16.7 | 7.1 | 7.1 | 2.5 |
| 13 | 50 | 6.7 | 5.1 | 0.4 |
| 14 | 16.7 | 7.1 | 7.1 | 1.4 |
| 16 | 16.7 | 7.4 | 7.4 | 1.7 |
| 18 | 16.7 | 7.4 | 7.4 | 2.6 |
| 20 | 10 | 7.3 | 2.5 | 0.6 |
| 21 | 10 | 7.3 | 3.0 | 0.3 |
| 22 | 10 | 2.2 | 2.7 | 2.3 |
| 23 | 10 | 7.3 | 5.5 | 0.5 |
| 24 | 10 | 1.9 | 2.2 | 0.7 |
| 25 | 10 | 4.3 | 1.2 | 1.0 |

[1]for compositions see Table 2.

Table 4 illustrates that for compositions containing PHMB and basic co-polymers the following conclusions can be drawn:
(i) All basic co-polymer/PHMB formulations show improved biocidal sustained effect after 1 and 2 washes over the control, which had no basic co-polymer present.
(iii) In the absence of basic co-polymer, PHMB has no useful biocidal activity after two wash cycles.

Sustained Fungicidal Activity of Basic Co-polymers with Various Biocides

Experimental Determination of the Residual Fungicidal Activity of Basic Co-polymer/Biocide Formulations.

Basic co-polymer/Biocide compositions were prepared as previously described (Table 2).

The residual antifungal activity of the samples was determined by the following methodology:
1. Films of each composition were created on glass microscope slides using a '0' K-Bar and allowed to dry for no less than 24 hours.
2. Fungi (Aspergillus niger ATCC 16404) were grown on malt agar plates at 25° C. for approx. 7 days.
3. An inoculum of approximately $10^7$ spores per ml was prepared in physiological saline (0.85% NaCl).
4. A 150 µl aliquot of fungal inoculum was added to the surface of the compositions and incubated at room temperature for 24 hours.
5. The number of surviving, viable organisms were then enumerated (samples were washed into a neutralising medium, serially diluted in physiological saline and plated out onto malt agar).
6. Each composition was then washed ten times by spraying with sterile distilled water.
7. Each composition was then re-inoculated and after 24 hours the number of viable organisms enumerated by the method described above.

Table 5 summarises the sustained fungicidal activity of the Basic co-polymer/Biocide formulations obtained using the above technique.

TABLE 5

Sustained Fungicidal Activity of Basic Co-polymers (Example 5) with Various Biocides.

| Composition | | Weight Ratio (w/w) Biocide: polymer | log reduction vs. A. niger @ 24 h after no. of washes; | |
|---|---|---|---|---|
| Number | % Wt of Biocide | | 0 | 10 |
| 27 | Biocide A | 499:1 | 1.6 | 1.1 |
| 29 | Biocide B | 199:1 | 3.5 | 3.4 |
| 31 | Biocide C | 499:1 | 3.4 | 3.5 |
| 33 | Biocide D | 499:1 | 3.4 | 3.4 |

It can be concluded that not only can stable formulations be prepared with the various biocides but that a sustained effect could be maintained using the spray washing protocol. The results in Table 5 show that 3 formulations gave excellent sustained fungicidal activity.

While the invention has been described above with references to specific embodiments thereof, it is apparent that many change, modifications, and variations can be made without departing from the inventive concept herein. Accordingly, it is intended to embrace all such changes, modifications and variations that fall within the spirit and broad scope of the appended claims. All patent applications, patents and other publications cited herein are incorporated by reference in their entirety.

What is claimed is:
1. A composition comprising:
  (i) an anti-microbial agent comprising a polymeric biguanide, alone or in combination with at least one other microbiologically active component selected from the group consisting of quaternary ammonium compounds, monoquaternary heterocyclic amine salts, urea derivatives, amino compounds, imidazole derivatives, nitrile compounds, tin compounds or complexes, isothiazolin-3-ones, thiazole derivatives, nitro compounds, iodine compounds, aldehyde release agents, thiones, triazine derivatives, oxazolidine and derivatives thereof, furan and derivatives thereof, carboxylic acids and the salts and esters thereof, phenol and derivatives thereof, sulphone derivatives, imides, thiomides, 2-mercapto-pyridine-N-oxide, azole fungicides, strobilurins, amides, carbamates, pyridine derivatives, compounds with active halogen groups, and organometallic compounds; and

(ii) a basic co-polymer of the Formula (1):

      Formula (1)

wherein:
[A] is of Formula (9),

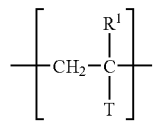      Formula (9)

[B] is of Formula (10),

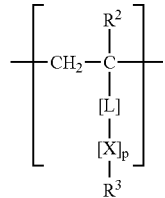      Formula (10)

and [D] is of Formula (12),

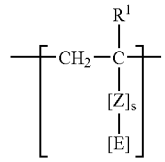      Formula (12)

[X] is of Formula (11),

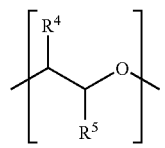      Formula (11)

wherein [A], [B] and [D] may occur in any order;

T is an optionally substituted substituent selected from the group consisting of CN, OH, F, Cl, Br, —$OR^6$, —$C(O)R^6$, —$OC(O)R^6$, —$C(O)OR^6$, —$C(O)NR^7R^8$ and aryl, optionally substituted by —$OC(O)R^6$, F, Cl, Br, $C_{1-6}$-alkyl, —$CH_2Cl$ or —$C(O)OR^6$, wherein $R^6$ is a $C_{1-10}$-alkyl optionally substituted by a ketone, ether, epoxide, silane or ketoester group, and wherein $R^7$ and $R^8$ are each independently H, $C_{1-8}$-alkyl or $C_{3-8}$-cycloalkyl optionally substituted by —OH, ketone or alkyl ether groups:

L is an optionally substituted linking group represented by a formula selected from the group consisting of

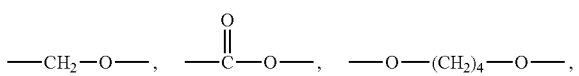

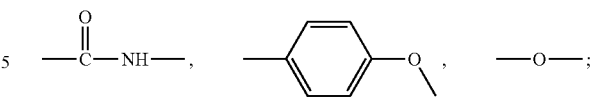

Z is an optionally substituted linking group represented by a formula selected from the group consisting of

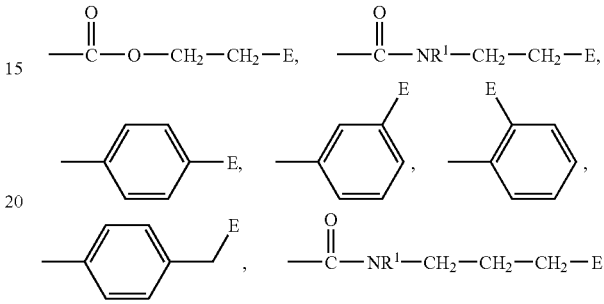

$R^1$, $R^2$ and $R^3$ are each independently H, optionally substituted $C_{1-20}$-alkyl or optionally substituted $C_{3-20}$-cycloalkyl;

$R^4$ and $R^5$ are each independently H or $C_{1-4}$alkyl;

E is a basic substituent:

q is 15 to 1000;

m is 0 to 350;

n is 1 to 75;

y is 1 to 100;

s is 0 or 1;

p is 3 to 50; and wherein [A] is present in the basic co-polymer in an amount of from 0% to 25% by weight and [B] is present in the basic co-polymer in a range of from 10% to 95% by weight, said amounts being based on the total weight of the basic co-polymer; and provided that at least one of $R^4$ and $R^5$ is H and provided that $R^1$, $R^2$, $R^3$, T, L and Z do not contain an acidic group which can protonate E on [D].

2. The composition of claim 1 wherein the polymeric biguanide is of Formula (6):

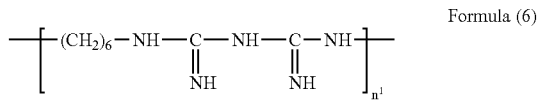      Formula (6)

wherein $n^1$ is from 4 to 20.

3. The composition of claim 1 wherein the basic co-polymer comprises a cloud point of greater than 15° C.

4. The composition of claim 1 wherein the basic co-polymer comprises from 10 to 95% by weight [B], from up to 25% by weight [A] and from 1 to 80% by weight [D].

5. The composition of claim 1 wherein $R^1$, $R^2$ and $R^3$ are each independently H or —$CH_3$.

6. The composition of claim 1 wherein $R^4$ and $R^5$ are each independently H.

7. The composition of claim 1 wherein T comprises a group of the Formula —C(O)OR$^6$, wherein $R^6$ comprises $C_{1-10}$-alkyl; and L comprises a group of the Formula,

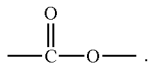

8. The composition of claim 1 wherein [Z] shown linked to basic substituent E in [D] is of the Formula;

wherein [E] comprises a secondary or tertiary aliphatic amine or a protonated or quaternised salt thereof and $R^1$ is as described in claim 1.

9. The composition of claim 1 wherein the basic co-polymer of Formula (1) comprises:

[A] of Formula (14),

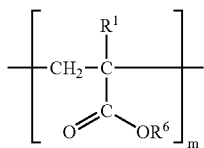

Formula (14)

[B] of Formula (15),

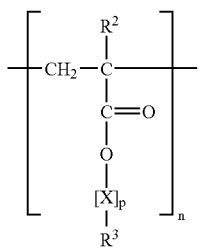

Formula (15)

and [D] of Formula (16),

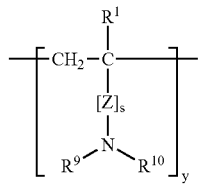

Formula (16)

wherein:
$R^1$, $R^2$ and $R^3$ is H or $CH_3$;
$R^6$ is $C_{1-108}$alkyl optionally substituted by a ketone, ether, —OH, epoxide, silane or ketoester group;
$R^9$ and $R^{10}$ are each independently H, optionally substituted $C_{1-10}$-alkyl or $C_{3-8}$-cycloalkyl; and
m, n, y, p, s, [X] and [Z] are as defined in claim 1.

10. The composition of claim 1 wherein the weight ratio of polymeric biguanide to basic co-polymer is from 100:1 to 1:1000 weight percent.

11. The composition of claim 1 which comprises a pH of from 1 to 12.

12. The composition of claim 1 wherein the anti-microbial agent further comprises a fungicide.

13. A formulation comprising:
(i) a linear polymeric biguanide;
(ii) a basic co-polymer; and
(iii) a carrier,
wherein the polymeric biguanide and basic co-polymer are as defined in claim 1.

14. The formulation of claim 13 wherein the carrier is water or a mixture of water and/or a water miscible organic solvent.

15. The formulation of claim 13 which comprises from 0.01 to 5% by weight polymeric biguanide and from 0.01 to 50% by weight basic co-polymer.

16. The formulation of claim 13 which comprises a pH in the range from 1 to 10.

17. A method of substantially reducing and sustaining the level of micro-organisms on a surface which comprises contacting the surface with the composition of claim 1.

18. A method of substantially reducing and sustaining the level of micro-organisms on a surface which comprises contacting the surface with the formulation of claim 13.

19. The composition of claim 1 wherein the weight ratio of polymeric biguanide to basic co-polymer is from 20:1 to 1:500 weight percent.

* * * * *

UNITED STATES PATENT AND TRADEMARK OFFICE
CERTIFICATE OF CORRECTION

PATENT NO. : 7,226,968 B2 Page 1 of 1
APPLICATION NO. : 10/850066
DATED : June 5, 2007
INVENTOR(S) : Hodge et al.

It is certified that error appears in the above-identified patent and that said Letters Patent is hereby corrected as shown below:

Claim 1, column 32, line 34 should recite --m is 1 to 350-- rather than "m is 0 to 350".

Signed and Sealed this

Twenty-fifth Day of March, 2008

JON W. DUDAS
*Director of the United States Patent and Trademark Office*